(12) United States Patent
Bilodeau et al.

(10) Patent No.: US 6,384,822 B1
(45) Date of Patent: May 7, 2002

(54) METHOD FOR RENDERING SHADOWS USING A SHADOW VOLUME AND A STENCIL BUFFER

(75) Inventors: William Bilodeau, Boulder Creek; Michael Songy, Sunnyvale, both of CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/417,374

(22) Filed: Oct. 13, 1999

Related U.S. Application Data
(60) Provisional application No. 60/134,083, filed on May 14, 1999.

(51) Int. Cl.[7] ............................................. G06T 15/00
(52) U.S. Cl. ................................................... 345/422
(58) Field of Search .................................. 345/419, 420, 345/421, 422, 426; 382/199

(56) References Cited

U.S. PATENT DOCUMENTS

| | | | |
|---|---|---|---|
| 5,163,126 A | 11/1992 | Einkauf et al. | 395/123 |
| 5,617,322 A | 4/1997 | Yokata | 364/468.04 |
| 5,659,671 A | 8/1997 | Tannenbaum et al. | 395/126 |
| 5,808,617 A * | 9/1998 | Kenworthy et al. | 345/422 |
| 5,825,369 A | 10/1998 | Rossignac et al. | 345/440 |
| 5,864,342 A * | 1/1999 | Kajiya et al. | 345/421 |
| 5,867,166 A * | 2/1999 | Myhrvold et al. | 345/419 |
| 5,870,097 A * | 2/1999 | Snyder et al. | 345/422 |
| 5,999,187 A * | 12/1999 | Dehmlow et al. | 345/420 |
| 6,252,608 B1 * | 6/2001 | Nyder et al. | 345/422 |
| 6,326,964 B1 * | 12/2001 | Snyder et al. | 345/419 |

OTHER PUBLICATIONS

"Stencil Buffer" information sheet, [online], [retrieved on Oct. 10, 1999], retrieved from http://www.microsoft.com/directx/developer/devfaq.asp#d3d.

"Computer Graphics Principles and Practice," Foley et al., pp. 749–753, Addison–Wesley Publishing Company, Jul. 1997.

"A Concise Review of 3D Technology," Glaskowsky, *Microprocessor Report*, Microdesign Resources, Jun. 21, 1999.

* cited by examiner

*Primary Examiner*—Phu K. Nguyen
(74) *Attorney, Agent, or Firm*—Townsend and Townsend and Crew, LLP

(57) ABSTRACT

A method for real-time shadow rendering in a 3-D graphics scene uses an inverted z-test to mark a shadow area in a stencil buffer. Front and back facing shadow volume polygons are rendered subsequent to rendering the scene and corresponding stencil buffer entries are incremented for pixels viewing the back facing polygon when the new z-test is passed and decremented for pixels viewing the front facing polygons when the new z-test is passed. The new z-test is passed for pixels having depth (z) values greater than the corresponding depth value stored z-buffer.

5 Claims, 3 Drawing Sheets

METHOD FOR RENDERING SHADOWS USING A SHADOW VOLUME AND A STENCIL BUFFER

CROSS-REFERENCE TO RELATED APPLICATION

This application claims priority from provisional application No. 60/134,083, filed May 14, 1999, the disclosure of which is incorporated herein by reference.

BACKGROUND OF THE INVENTION

1. Field of the Invention

The present invention relates to 3-D computer graphics and more particular to rendering shadows cast by objects in a 3-D scene.

2. Description of the Relevant Art

Realistic 3-D rendering of a scene requires rendering shadows cast by objects in the scene. The importance of shadow in locating an object relative to a plane is depicted in FIGS. 1A and 1B. Note that in FIG. 1A it is not clear whether the sphere is touching the plane while in FIG. B the rendering of the shadow makes the relationship clear.

For static scenes shadows can be rendered using a ray casting procedure. However, for animation, such as utilized in 3-D computer games, shadows must be rendered in real time. Shadows create dramatic effects in games, for example making monsters look more sinister. Additionally, if a game is played by multiple players, shadows enhance the game quality because opponents may be able to see a shadow before the actual game character appears on the screen.

One real-time prior art shadow rendering technique utilizes a stencil buffer. As is well-known in the art, when rendering a scene each object in the scene is drawn. A depth value, called the z value, is calculated to indicate the distance to the last polygon drawn for each pixel on the screen. The z-values for all the pixels on the screen are referred to as the z buffer. Before the scene is rendered, the z buffer is initialized to a maximum distance. As each polygon is drawn there may be hits to a given pixel from more than one polygon. A standard z-test is performed where the z value of the present polygon is compared to the z value stored in the z buffer. The new polygon passes the z-test only if its z value is less than the z value stored in the z buffer, indicating the present polygon surface is in front of the previous polygon surface stored in the pixel. Accordingly, after all the polygons are drawn each pixel is left with the value of the front-most surface of the front-most object. Therefore, the z buffer stores the depth information for each pixel.

A stencil buffer is an additional buffer of per-pixel information, much like a z-buffer. Common stencil/z-buffer formats are 15-bit z and 1-bit stencil, or 24-bit z and 8-bit stencil. It is possible to perform simple arithmetic operations on the contents of the stencil buffer on a per-pixel basis as polygons are rendered. For example, the stencil buffer can be incremented or decremented, or the pixel can be rejected if the stencil value fails a simple comparison test. This is useful for effects that involve marking out a region of the frame buffer, and then performing rendering only on the marked (or unmarked) region. Good examples are volumetric effects like shadow volumes.

Thus, for example, the stencil buffer could be set only for pixels in an area in shadow and then the area in the shadow is filled with a transparent gray rectangle or the light for each pixel could be reduced to create a shadow effect.

The standard prior art technique first calculates a shadow volume which is defined by transparent polygons (Crow, F. C., "Shadow Algorithms for Computer Graphics," SIGGRAPH 77,242–247). A shadow volume for a first scene object is the region of space in which a first object will cast a shadow on any other object appearing in that region. Like any other volume in computer graphics, it is usually represented as a polygon mesh. The art provides a variety of techniques for constructing shadow volumes. In "Computer Graphics, Principals and Practice," second edition, Folly, Van Dam, Feiner, Hughes, on page 749, chapter 16.4.3 describes this technique and also includes bibliographic references.

A technique for using the stencil buffer to render shadows based on a shadow volume 10 is depicted in FIG. 2. A scene with a shadow volume is rendered in three stages. First, the scene without the shadow is rendered as usual to a bitmap 11, configured as a rectangular grid of pixels, using the z-buffer. Thus, the z buffer holds the instances from a viewpoint 12 to all the polygons rendered in the scene.

Next, the shadow is marked out in the stencil buffer as follows. The faces of the shadow volume 10 are drawn using invisible polygons 14 and 16. A polygon is front facing if the dot product of its outward normal with the vector from the viewpoint to the scene is negative. (For opaque solids, the front-facing polygons are the ones that the can be seen from the view point.) A polygon is back facing if the dot product of its outward normal with the vector from the viewpoint to the scene is positive. (For opaque solids, the back-facing polygons are the ones that cannot be seen from the viewpoint.)

In this example, only one back-facing polygon 14, having a normal vector $14n$ pointing away from the viewer 12, and one front facing polygon 16, having a normal vector $16n$ pointing toward the view 12, are depicted. The z-testing procedure is enabled so that the depth of the shadow volume pixels will be compared with the depth of the scene pixels but z-writes are disabled so that the z-buffer will not be changed by the test.

The invisible front facing polygon 16 is rendered first. For each pixel the z-test is conducted and the stencil buffer entry for that pixel is incremented only if the z-value of the front facing pixel passes the standard z-test. The invisible back facing polygon 14 is rendered second. For each pixel the z-test is conducted and the stencil buffer entry for that pixel is decremented only if the z-value of the back facing pixel passes the standard z-test.

The results of this technique are depicted in FIG. 2. For pixels p1 representing a first scene polygon 20 located behind the shadow volume 10 the stencil buffer entry is decremented when the back-facing polygon 14 is drawn and incremented when the front facing polygon 16 is drawn so that the stencil buffer entry remains zero, i.e., the first scene polygon is not in the shadow.

For pixels p2 representing a second scene polygon 22 located within the shadow volume 10 the pixel fails the z-test when the back facing polygon 14 is drawn, so the stencil entry is not decremented, but passes the z-test when the front facing polygon 16 is drawn so the stencil buffer is incremented for a net increment of the stencil buffer entry, i.e., the second scene polygon 22 is in the shadow.

For pixels p3 representing a third scene polygon 24 located in front of the shadow volume 10, the stencil buffer entry is neither decremented when the back-facing polygon 13 is drawn nor incremented when the front facing polygon 16 is drawn because the pixel fails the z-test for each shadow volume polygon. Therefore, the stencil buffer entry remains zero, i.e., the third scene object is not in the shadow.

A problem with the prior art technique occurs when the viewpoint is within the shadow volume, or, more generally, when the shadow volume intersects the near clipping plane of the viewing frustum, as depicted in FIG. 3. All the shadow volume polygons are back facing. However, for a fourth scene object 30 located within the shadow volume 10, the z-test fails for the back facing polygons so that the stencil buffer entries remain zero. Thus, the fourth scene object is not in a shadow, which is incorrect.

A solution to the problem is to set the stencil buffer to I for all polygons within the intersection of the shadow volume and the viewing frustum. However, doing so requires the determination of the shape of this intersection, which can be complex.

Accordingly, improved techniques are required for rendering shadows in real-time to add realism and drama to 3-D video applications.

SUMMARY OF THE INVENTION

According to one aspect of the present invention, an improved method for creating shadows in 3-D graphics relies solely on z-testing to set the stencil buffer bits for the shadows, regardless of whether the viewpoint is within the shadow volume.

According to another aspect of the invention, a new z-test inverts the standard z-test so that only pixels having depth (z) values greater than the corresponding depth (z) value stored in the z-buffer pass the new z-test.

According to another aspect of the invention, a 3-D graphics scene is first drawn without the shadow volume polygons and the depth (z) values for the scene are set in the depth (z) buffer.

According to another aspect of the invention, subsequent to setting the depth (z) buffer the back facing and front facing polygons are drawn and the stencil buffer is incremented for pixels passing the new z-test when the back facing polygon is drawn and decremented for pixels passing the new z-test when the front facing polygon is drawn.

Other features and advantages of the invention will be apparent in view of the following detailed description and appended drawings.

DESCRIPTION OF THE SPECIFIC EMBODIMENTS

Figure 1A:
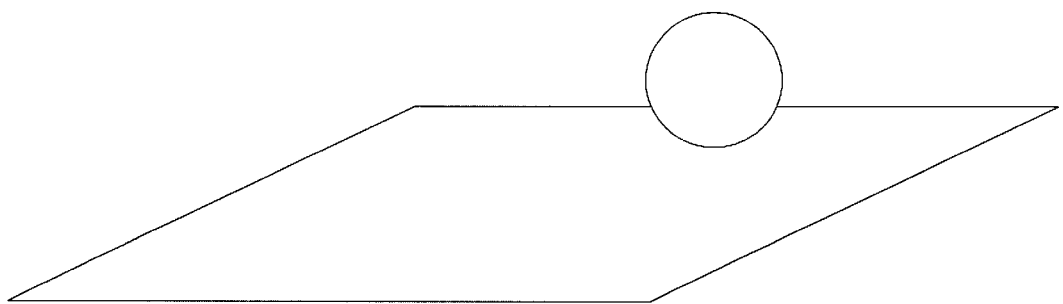
FIGS. 1A and 1B are drawings depicting the use of shadow to define the spatial relationship between a sphere and a plane.
Figure 1B:
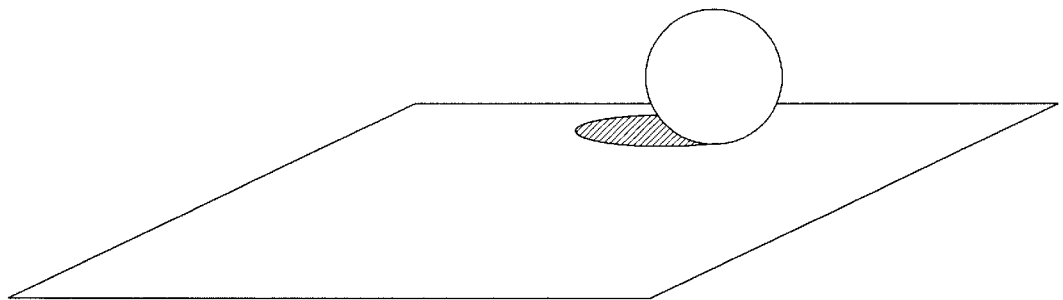
Figure 2:
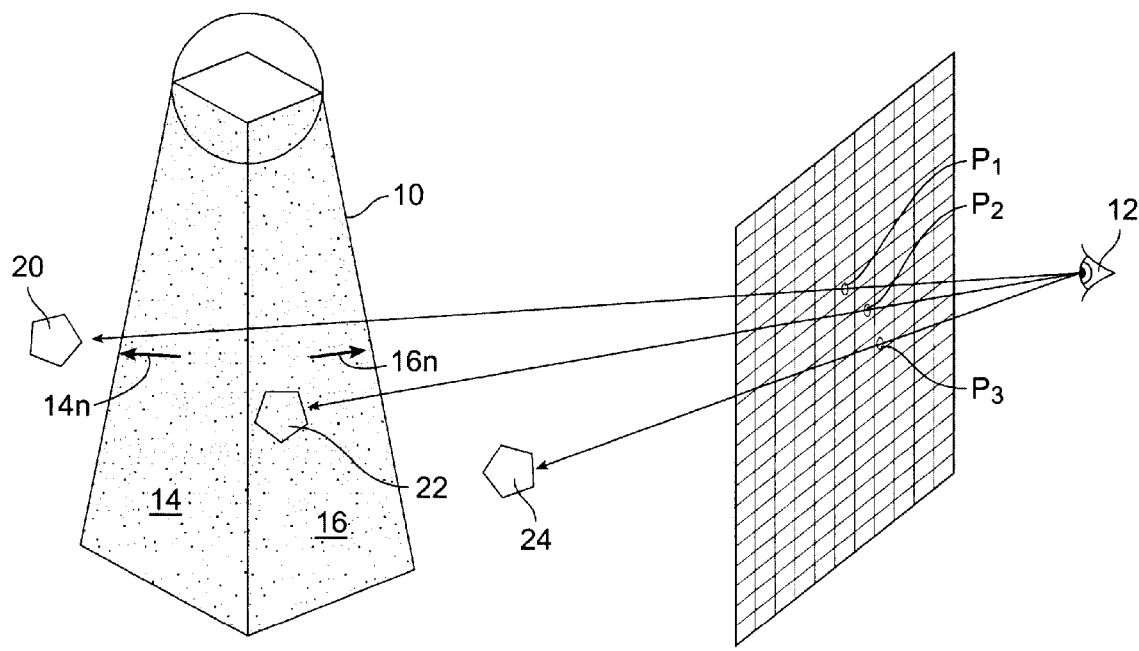
FIG. 2 is a diagram depicting a shadow volume and viewpoint outside the shadow volume.

A preferred embodiment of the present shadow rendering process will be described with reference to the following pseudo-code and FIG. 2.

```
V = viewpoint;
VV = view direction;
SV = shadow volume;
SB = stencil buffer;
/* newZTest(X, P) returns TRUE if polygon P is farther or
        same distance from viewer at pixel X than current content
        of z buffer. */
    renderScene();              /* Step A, no shadow */
    disableZwrite();            /* Step B, newZTest() will not update z buffer */
    /* Step C, init stencil buffer */
    SB = 0;
    /* Step D, render backfacing shadow polygons */
    for (P = polygon in SV) {
        if (dot(normal(P), VV) > 0) {
            for (X = pixel where P appears) {
                if (newZTest(X, P)) { SB(X)++; }
            }
        }
    }
    /* Step E,render frontfacing shadow polygons */
    for (P = polygon in SV) {
        if (dot(normal(P), VV) < 0) {
            for (X = pixel where P appears) {
                if (newZTest(X, P)) { SB(X)--; }
            }
        }
    }
    renderShadow(SB);           /* Step F, render shadow, using stencil buffer */
```

A key step in the present process is the definition of the newZTest (X, P) function which inverts the z-test comparison used in the prior art. In the usual test, pixels having depth (z) values less than the depth (z) values stored in the z-buffer pass the z-test. In newZTest( ), pixels having depth (z) values greater than the corresponding depth (z) value stored z-buffer values pass the new z-test.

Steps A and B are similar to the prior art, the polygons in the scene are drawn and z-buffer values for the scene are stored. newztest( ) is enabled and z-write is disabled.

In step C, the all bits in the stencil buffer are reset to initialize the buffer. As will be apparent below, there is no need to set the stencil bits in the case where the viewpoint is within the shadow volume.

In step D, the back-facing shadow volume polygons are drawn. This reverses the order of the prior art algorithm and also uses the newZTest( ) function to alter the stencil buffer entries.

Similarly, in step E, the front facing shadow volume polygons are drawn and the stencil buffer entries are altered accordingly using the newZTest( ) function.

Finally, in step F, the shadow is rendered based on the stencil buffer entries.

The results of the new process for the viewpoint outside the shadow volume are the same as the prior art. Referring again to FIG. 2, for pixels p1 representing the first polygon 20 located behind the shadow volume 10, the stencil buffer entry is neither incremented when the back-facing polygon 14 is drawn nor decremented when the front facing polygon 16 is drawn because neither the front facing nor back facing polygon passes the new z-test, i.e., is farther from the viewpoint than the first scene object 20 being rendered. Therefore, the stencil buffer entry remains zero, i.e., the first scene polygon 20 is not in the shadow.

For pixels p2 representing the second scene polygon 22 located within the shadow volume 10, the pixel passes the new z-test when the back facing polygon 14 is drawn because the back facing polygon 14 is farther from the viewpoint 12 than the second scene object 22 being drawn, so the stencil entry is incremented but the pixel fails the new z-test when the front facing polygon 16 is drawn because the front facing polygon 16 is not farther from the viewpoint 12 than the object being rendered so that the stencil buffer entry is not decremented for a net increment of the corresponding stencil buffer entry, i.e., the second scene polygon 22 is in the shadow.

For pixels p3 representing the third scene polygon 24 located in front of the shadow volume 10, the pixel passes the new z-test and the stencil buffer entry is incremented when the back-facing polygon 14 is drawn and passes the new z-test and is decremented when the front facing polygon 16 is drawn so that the stencil buffer entry remains zero, i.e., the third scene polygon 24 is not in the shadow.

Figure 3:
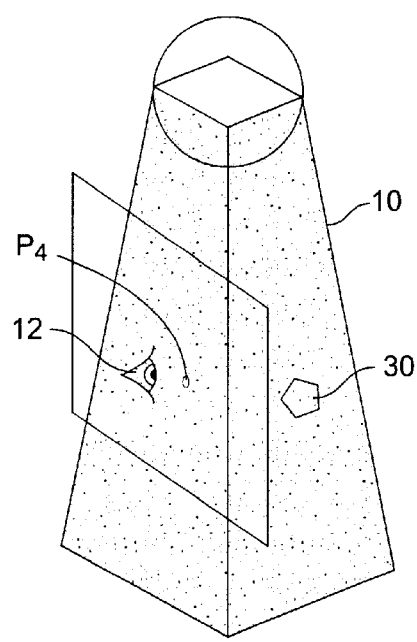
FIG. 3 is a diagram depicting a shadow volume and a viewpoint within the shadow volume.

However, referring to FIG. 3, when the viewpoint 12 is within the shadow volume 10, all the shadow volume polygons are back-facing. Thus, all scene polygons within shadow volume pass the new z-test when the back facing shadow volume polygons are drawn and the corresponding stencil buffer entries are incremented in step E. Thus, scene polygons within the shadow volume 10 are in the shadow. However, scene polygons outside the shadow volume have their stencil buffer entries unchanged using newZTest( ) and are not in the shadow.

Figure 4:
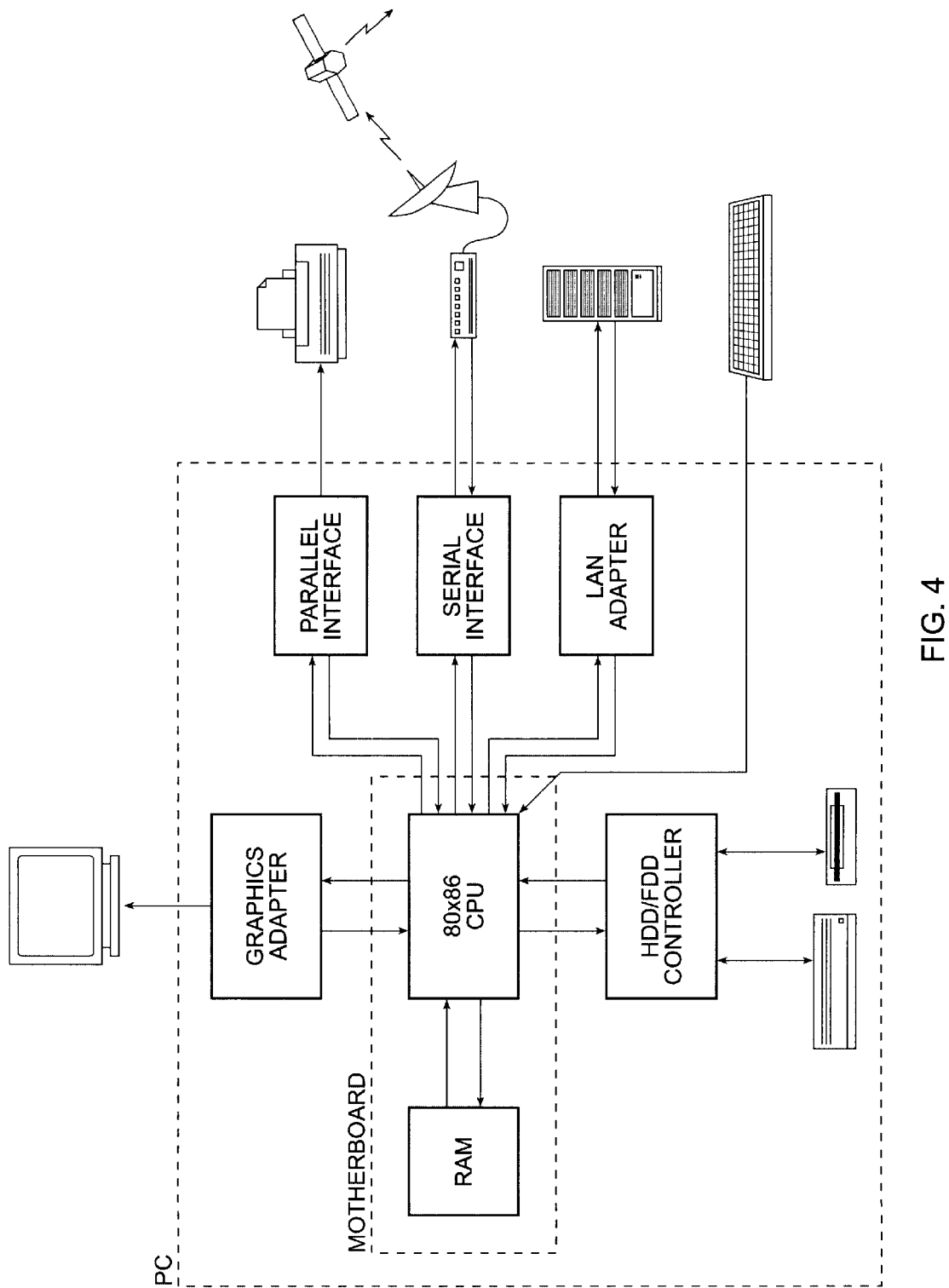
FIG. 4 is a block diagram of a computer for performing implementing embodiments of the invention.

FIG. 4 depicts a computer system including a CPU, graphics card, display, and input devices suitable for practicing the preferred embodiments of the present invention.

The invention has now been described with reference to the preferred embodiments. Alternatives and substitutions will now be apparent to persons of skill in the art. Accordingly, it is not intended to limit the invention except as provided by the prior art.

What is claimed is:

1. A 3-D graphics method performed by a computer for real-time rendering of shadows in 3-D scenes to be displayed on a computer monitor, with the method using a shadow volume, calculated for a first object in a 3-D scene and defined as a region of space in the 3-D scene bounded by transparent shadow volume polygons in which the first scene object will cast a shadow on any part of another scene object included with in the shadow volume, and the method using a stencil buffer and a depth buffer, with both the stencil buffer and depth buffer having an entry for each pixel in a bit map for displaying the 3-D scene on a computer monitor, said method comprising the steps of:

drawing the 3-D scene without the transparent shadow volume polygons and rendering depth into the depth buffer;

enabling an inverted depth buffer comparison test where a current pixel having a depth value greater than a depth value stored in a corresponding entry of the depth buffer passes the test;

disabling writes to the depth buffer;

initializing the stencil buffer by resetting all stencil buffer entries;

for a current viewpoint, rendering transparent shadow polygons facing away from the current viewpoint and incrementing corresponding stencil buffer entries only for pixels which pass the inverted depth buffer comparison test; and for the current viewpoint, rendering transparent shadow polygons facing toward the current viewpoint and decrementing corresponding stencil buffer entries only for pixels which pass the inverted depth buffer comparison test so that the stencil buffer marks out an area of the 3-D scene included in the shadow cast by the first object.

2. The method of claim 1 further comprising the steps of:

filling the area marked out by the stencil buffer with a transparent gray polygon to cause a shadow to appear.

3. The method of claim 1 further comprising the steps of:

dimming the light falling in the area marked out by the stencil buffer to cause a shadow to appear.

4. The method of claim 1 further comprising the steps of:

calculating the dot product of an outward normal of each transparent shadow volume polygon with a vector pointing from the current viewpoint to the transparent shadow polygon;

identifying transparent shadow volume polygons as facing toward the viewpoint if a value of the dot product is negative;

identifying transparent shadow volume polygons as facing away from the viewpoint if the value of the dot product is positive.

5. A computer program product for real-time rendering of shadows in 3-D scenes to be displayed on a computer monitor, with the method using a shadow volume, calculated for a first object in a 3-D scene and defined as a region of space in the 3-D scene bounded by transparent shadow volume polygons in which the first scene object will cast a shadow on any part of another scene object included with in the shadow volume, and with the computer program product using a stencil buffer and a depth buffer, with both the stencil buffer and depth buffer having an entry for each pixel in a bit map for displaying the 3-D scene on a computer monitor, said computer program product comprising:

a computer readable medium for storing computer program code therein, with said computer program code including;

computer program code for drawing the 3-D scene without the transparent shadow volume polygons and rendering depth into the depth buffer;

computer program code enabling an inverted depth buffer comparison test where a current pixel having a depth value greater than a depth value stored in a corresponding entry of the depth buffer passes the test;

computer program code disabling writes to the depth buffer;

computer program code initializing the stencil buffer by resetting all stencil buffer entries;

for a current viewpoint, computer program code rendering transparent shadow polygons facing away from the current viewpoint and incrementing corresponding stencil buffer entries only for pixels which pass the inverted depth buffer comparison test; and for the current viewpoint, computer program code rendering transparent shadow polygons facing toward the current viewpoint and decrementing corresponding stencil buffer entries only for pixels which pass the inverted depth buffer comparison test so that the stencil buffer marks out an area of the 3-D scene included in the shadow cast by the first object.

* * * * *